Patented Mar. 18, 1947

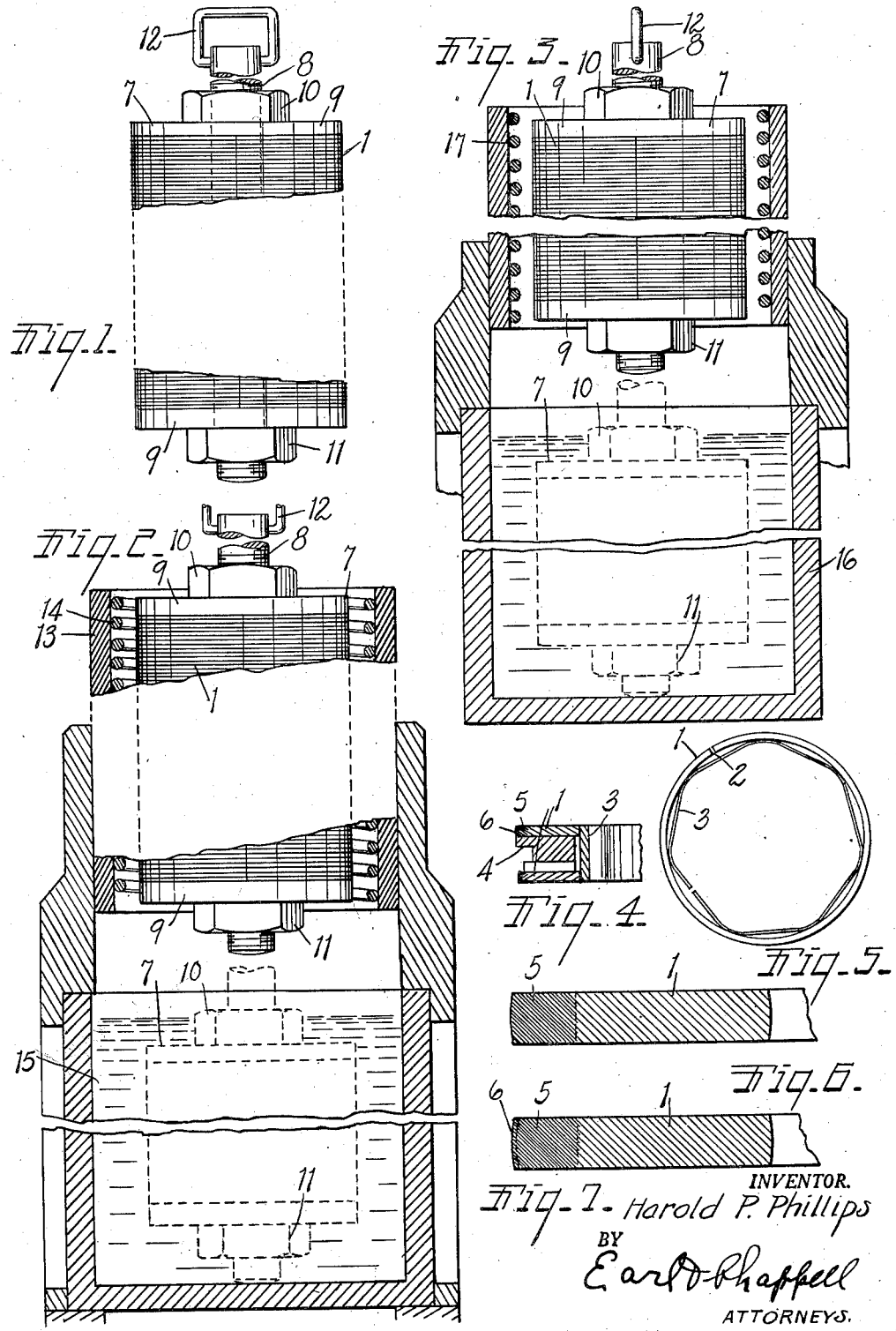

2,417,610

UNITED STATES PATENT OFFICE 2,417,610

METHOD OF MANUFACTURING PISTON RINGS

Harold P. Phillips, Hastings, Mich., assignor to Hastings Manufacturing Company, Hastings, Mich., a corporation of Michigan Application May 11, 1944, Serial No. 535,045

2 Claims. (Cl. 148—10)

This invention relates to improvements in method of manufacturing piston rings.

The main objects of this invention are:

First, to provide a method of manufacturing piston ring elements of the type formed of ribbon steel coiled edgewise which results in the production of ring elements of greatly increased wear resistant qualities, at the same time not interfering with the resilience and other desirable qualities of the element.

Second, to provide a method of producing piston ring elements having relatively soft peripheral surface portions facilitating the wearing in thereof and underlying the hardened wear-resisting portion surrounding and integral with the main body of the element which is in the condition resulting from the coiling of the element from ribbon steel coiled edgewise.

Third, to provide a method of producing piston ring elements which may be economically practiced on a large scale and with great uniformity as to results.

Objects relating to details and economies of the invention will appear from the description to follow. The invention is defined and pointed out in the claims.

A structure for the practice of the method of the invention is illustrated in the accompanying drawing, in which:

Fig. 1 is a holder or chuck for a plurality of piston ring elements of the split resilient type for subjecting them to hardening operations.

Fig. 2 is a fragmentary view of an apparatus for hardening the peripheral portions of the ring elements.

Fig. 3 is a fragmentary view of an apparatus for annealing the peripheral portion of the ring elements to facilitate wearing-in thereof.

Fig. 4 is a fragmentary sectional view illustrating one piston ring assembly for which my ring elements are well adapted.

Fig. 5 is a side elevation of one of the ring elements with an expander associated therewith, no attempt in this view being made to illustrate the hardened edge portion.

Fig. 6 is an enlarged fragmentary section of a piston ring element subjected to certain of the steps of my invention.

Fig. 7 is a fragmentary section of a piston ring element which has been subjected to the final or additional steps of the method.

I have illustrated an apparatus for practicing my method in the manufacture of ring elements of the type of the side members illustrated in Patent 2,148,997, dated February 28, 1939.

The ring elements 1 are formed of ribbon steel coiled edgewise and may desirably be of the order of .020 to .025 of an inch in axial thickness. These elements have splits 2 therein and while they are inherently resilient and expansible they are commonly used with inner or expander springs 3 and associated with an intermediate or spacer element 4. While the elements are formed of ribbon steel they are subject to severe wear particularly in some motors, the elements being particularly desirable for replacement purposes, and by this method I provide the ring elements with an outer wear resisting surface 5 preferably of a depth approximating $\frac{1}{32}$ of an inch. The major portion of the element is, however, in substantially the condition resulting from the coiling. The elements are flat or commercially flat.

In view of the hardness of the wear portion 5, it is desirable to provide a soft peripheral surface 6 facilitating the quick wearing in of the element. Ring elements of this type are the subject matter of a copending application, the present application being for the method of producing the same.

In the accompanying drawing, I illustrate one apparatus for the efficient practice of the method. This comprises a holder designated generally by the numeral 7 and consisting of a rod or core 8 provided with clamping plates 9 and threaded to receive the clamping nuts 10 and 11. The rod is provided with a suspending loop 12 adapted to receive a hanger by means of which the holder loaded with a plurality of ring elements 1 as formed of ribbon steel coiled edgewise arranged in side by side mutually supporting relation may be lowered into the induction heater 13, a coil of which is conventionally shown at 14. Below this induction heater is a quenching tank 15.

In practicing the method, the split flat resilient ring elements are formed of ribbon steel coiled edgewise. A plurality of these are arranged on the chuck or holder and clamped therein so that only their edges are exposed. They are, in this condition, lowered into the induction heater and left therein until their edges are heated to proper tempering temperatures and the chuck is then lowered into the quenching tank. The ring elements without further treatment are highly desirable for use. The hardened portion is of substantially greater hardness than the major portion of the ring element which may with satisfactory results range from 300 to 500 "Brinnell test" or from 40 to 55 "Rockwell test." The hardened area may with satisfactory results range from 60 to 70 "Rockwell test" or 700 to 900 "Brinnell."

As this hardened area is relatively restricted, preferably in the neighborhood of 3/32 of an inch, it does not materially affect the resilience or expansibility of the ring element and it does not render the same subject to breakage in installation and in use as would result if the entire ring element were formed of the hard stock. Further than that, it would not be practical to form the ring elements of the ribbon stock of hardness equal to the hardened wear resisting portion.

Ring elements having a hardened portion extending to the edge thereof require more than the wearing in and therefore in the preferred form of my method I anneal the peripheral portion of the hardened portion 5 as shown at 6 in Fig. 7 and the thickness of the annealed portion is desirably about .003 of an inch although it may range from .002 to .005 of an inch with very satisfactory results.

The annealing step is illustrated in Fig. 3 and is performed while the ring elements are still mounted in the chuck or holder 7 and without their being released or their position changed in any way. The same type of induction heater is employed as is used for hardening, such an induction heater being shown at 17 in Fig. 3 and it has an associated quenching tank 16.

The use of this quenching tank results in uniformity of the work and of course it will be understood that the heating should be properly timed to heat to the proper depth and in quenching time to result in the desired relatively soft wear surface 6 which, as stated, facilitates the wearing in.

The hardness of the wear resisting surface may be greatly varied and also the depth of the hardened surface which while a desirable average is 3/32 of an inch, very satisfactory results may be had from 1/64 to 3/64 of an inch in depth.

Other apparatus may be employed for practicing the method but that illustrated is highly satisfactory and enables the practicing of the method with uniform results by workmen who would not be classed as skilled in the art of tempering.

I have not attempted to illustrate or describe the various forms of apparatus which may be employed for the practice of my invention as it is believed that from the disclosure made such apparatus will be understood by those skilled in the art.

Having thus described my invention, what I claim as new and desire to secure by Letters Patent is:

1. The method of forming piston ring elements comprising the steps of forming a plurality of flat split resilient ring elements by coiling ribbon steel edgewise, clamping a plurality of the elements in side by side contacting relation with their outer edges exposed, subjecting only the outer edge portions of the elements while so supported to an induction heater disposed exteriorly of said ring elements to heat said outer edge portions to a substantially higher temperature than the inner edge portions, and quenching to harden only said outer edge portions to provide cylinder engaging wear resisting surfaces of substantial depth and of a hardness substantially exceeding the hardness of the ribbon steel stock, and while the ring elements are supported in the relation in which they are hardened annealing the hardened edge portions by subjecting to an induction heater to a depth substantially less than the hardened depth, said annealing being only a layer sufficient to provide relatively thin outer annealed cylinder engaging quick wear-in surfaces outside said hardened wear resisting portions of substantially greater thickness, the inner and major portions of the ring elements after said hardening and annealing treatments of the outer edge portions being substantially in that condition of resilience and tenacity resulting from said coiling of the ribbon steel edgewise.

2. The method of forming piston ring elements comprising the steps of forming a plurality of flat split resilient steel elements, disposing a plurality of the elements in coacting supporting side by side contacting relation, heating only outer edge portions of the elements to a hardening temperature, said outer edge portions being heated to a substantially higher temperature than the inner edge portions, and quenching to harden only said outer edge portions to a hardness substantially exceeding the hardness of the ring elements to a substantial depth, the inner and a substantial portion of the element being in the condition of resiliency and tenacity before hardening the outer edge portion, and while the ring elements are supported in the relation in which they are hardened annealing the hardened edges to a relatively slight depth, said annealing being only a layer sufficient to provide a quick wearing surface outside said hardened wear resisting portion of substantially greater thickness.

HAROLD P. PHILLIPS.

REFERENCES CITED

The following references are of record in the file of this patent:

UNITED STATES PATENTS

| Number | Name | Date |
|---|---|---|
| 2,280,552 | Somes | Apr. 21, 1942 |
| 2,281,334 | Somes | Apr. 28, 1942 |
| 2,125,606 | Deeb | Aug. 2, 1938 |
| 2,202,759 | Denneen et al. | May 28, 1940 |
| 2,315,798 | Koether | Apr. 6, 1943 |

FOREIGN PATENTS

| Number | Country | Date |
|---|---|---|
| 29,563 | British | Nov. 2, 1905 |
| 491,919 | British | Sept. 9, 1938 |